May 4, 1965

R. EPSTEIN 3,181,916

AIR CONVEYOR OR PNEUMATIC CONVEYOR FOR
LIGHT MATERIALS, PLASTICS ETC.

Filed Nov. 4, 1963

INVENTOR.
Ralph Epstein
BY Polachek & Saulsbury
ATTORNEYS.

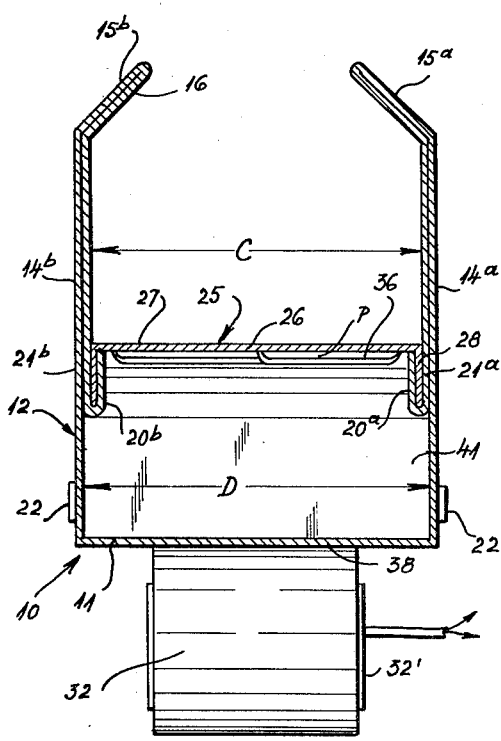
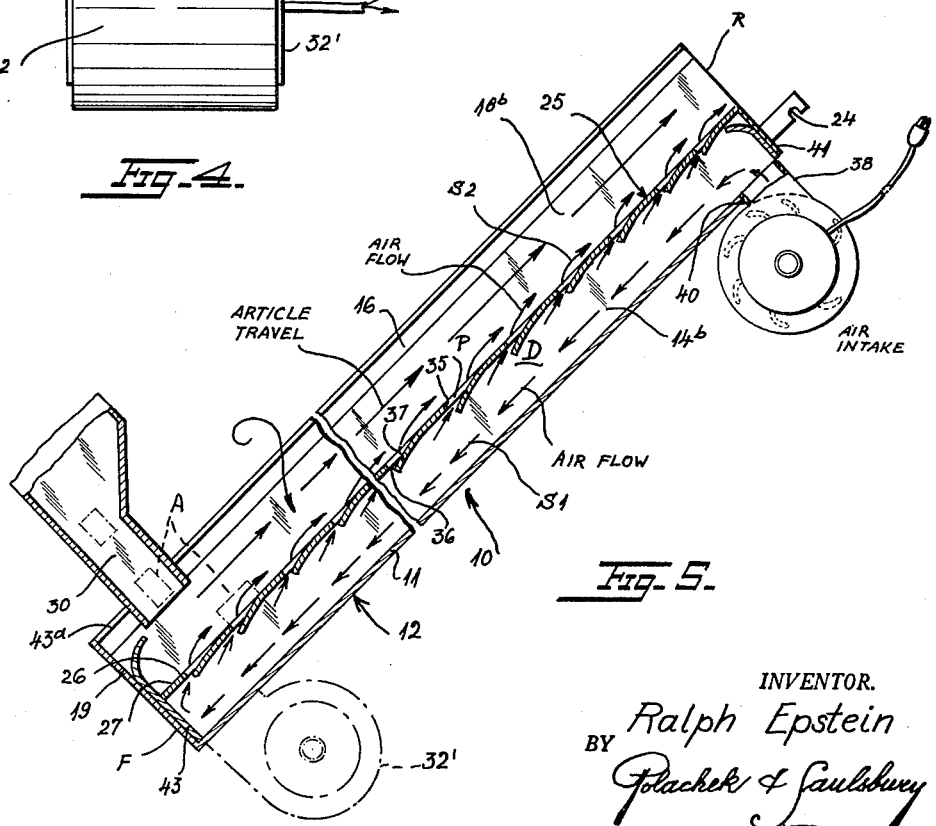

May 4, 1965 R. EPSTEIN 3,181,916
AIR CONVEYOR OR PNEUMATIC CONVEYOR FOR
LIGHT MATERIALS, PLASTICS ETC.
Filed Nov. 4, 1963 3 Sheets-Sheet 3
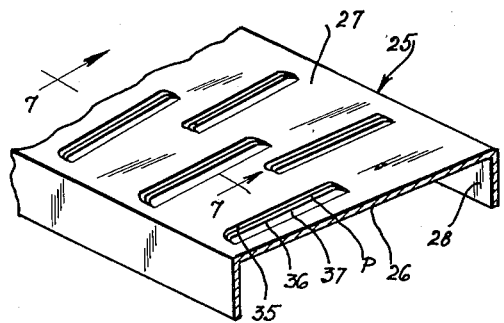
Fig-6-
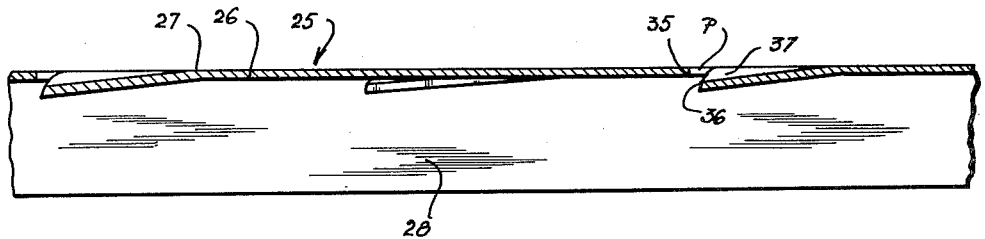
Fig-7-
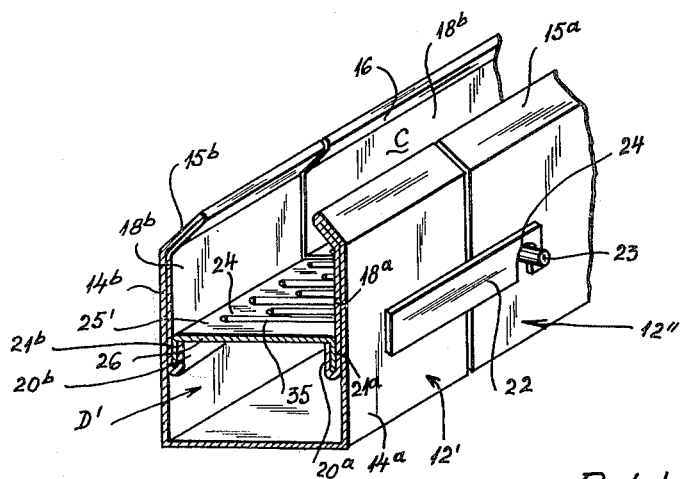
Fig-8-
INVENTOR.
Ralph Epstein
BY Polachek & Saulsbury
ATTORNEYS.

United States Patent Office 3,181,916
Patented May 4, 1965

3,181,916
AIR CONVEYOR OR PNEUMATIC CONVEYOR FOR LIGHT MATERIALS, PLASTICS ETC.
Ralph Epstein, 12 Roger Ave., Lincroft, N.J.
Filed Nov. 4, 1963, Ser. No. 321,142
2 Claims. (Cl. 302—29)

This invention concerns a conveyor for small, light articles.

According to the invention there is provided a trough in which is a closed duct through which a stream of air is blown. The duct has a top wall provided with a series of transverse slits having lips bent inwardly into the duct. This provides a smooth upper surface on the top wall along which small articles can move freely in an air stream passing through the slits. The trough and duct are made of thin sheet metal material. This material serves to conduct heat away from the articles which may be discharged in a heated condition from a molding machine onto the conveyor and which contact the sheet metal material in passing therethrough. The conveyor can be disposed in an inclined plane and the articles will pass upwardly along the trough from a lower to a higher level. A plurality of troughs can be secured together to obtain a conveyor of extended length. The blower producing the air stream may be located at either end of the conveyor. Regardless of the location of the blower the air stream will move along the upper surface of the top wall of the duct in a single direction determined by the disposition of the lips of the slits in the top wall of the duct. The invention provides a simpler, less complex conveyor construction that is possible with conveyors using belts, chains, and the like. The invention is especially intended for use in conveying small, light articles made of plastic, rubber, and the like from a molding machine to another location for packing, processing, etc.

It is therefore one object of the invention to provide a conveyor made of thin, sheet metal, the conveyor including a trough having a lower closed duct, the duct having a removable top wall in which is a series of transverse slits with lips extending into the duct.

A further object is to provide a conveyor as described with means for quickly attaching two or more troughs together to form a conveyor of extended length.

Another object is to provide a conveyor as described of simplified construction, which will operate in horizontal or inclined planes, and which is adapted for cooling articles while conveying the same in an air stream.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 4 is a cross-sectional view taken on line 4—4 of FIG. 3.

FIG. 5 is a longitudinal sectional view of a conveyor assembly in an inclined position.

FIG. 6 is a fragmentary perspective view of the top wall of the duct.

FIG. 7 is an enlarged fragmentary sectional view taken on line 7—7 of FIG. 6.

FIG. 8 is a fragmentary perspective view partially in cross section of ends of two attached conveyors.

Figure 1:
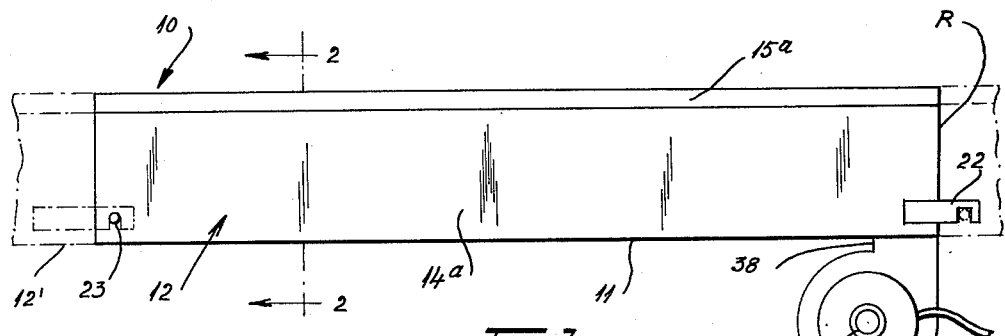
FIG. 1 is a side elevational view of a conveyor assembly embodying the invention.
Figure 2:
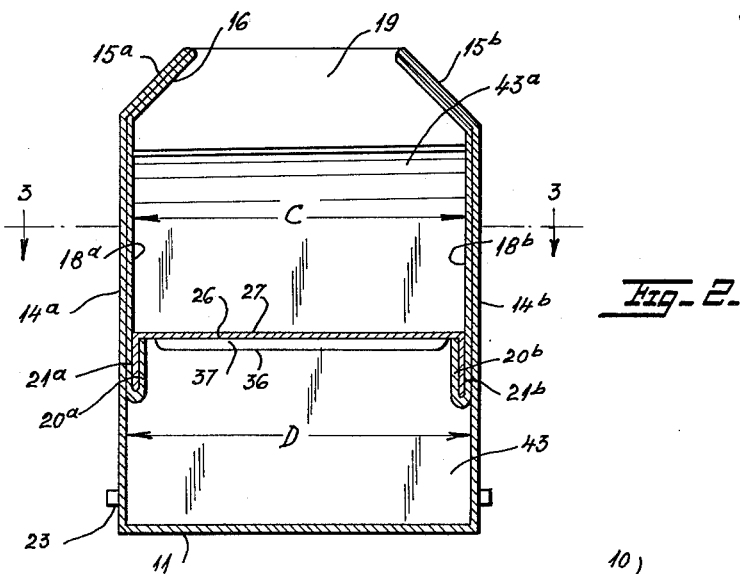
FIG. 2 is an enlarged cross-sectional view taken on line 2—2 of FIG. 1.
Figure 3:
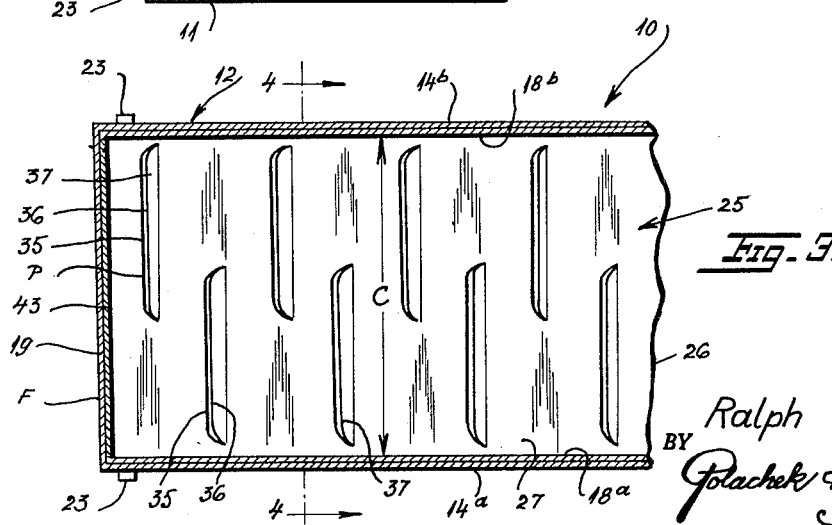
FIG. 3 is a fragmentary longitudinal sectional view of the conveyor taken on line 3—3 of FIG. 2.

Referring first to FIGS. 1–5, there is shown a conveyor assembly 10 which includes a trough 12 made of thin sheet metal material of high heat conductivity. The trough has a flat bottom wall 11 and two flat, parallel, vertical, outer side walls $14^a$, $14^b$. The upper edges of the side walls are bent inwardly to form inclined flanges $15^a$, $15^b$ extending the full length of the trough. The sheet material is bent inwardly at upper edges of the flanges to form inner flange walls 16 juxtaposed to each of the outer flanges $15^a$, $15^b$. The trough has inner side walls $18^a$, $18^b$ juxtaposed to inner sides of walls $14^a$, $14^b$ and integral with the flanges 16. The inner side walls are shorter than the outer side walls. Upturned flanges $20^a$, $20^b$ are formed at lower ends of the side walls $18^a$, $18^b$ to define narrow grooves $21^a$, $21^b$ extending the entire length of the trough. The grooves are closed at the bottom and open at the top.

In order to attach a plurality of troughs together in alignment, there may be provided a pair of arms 22 extending outwardly of one end of the trough at outer sides of walls $14^a$, $14^b$. At the other ends of the walls $14^a$, $14^b$ are laterally extending pins 23. Notches 24 are formed at the bottom edges of the arms to engage on pins of an attached trough. The trough may have an end wall 19 to close its forward end while the rear end of the trough is open.

A duct D is defined at the bottom of the trough by a channel-shaped partition 25 made of thin sheet metal material. This partition, as shown to best advantage in FIGS. 5–7, has a flat wall 26 and two depending, parallel, side walls 28. The side walls fit removably inside the groove $21^a$, $21^b$ at the inner sides of the trough so that wall 26 forms the top wall of the duct. The upper side 27 of the wall 26 is smooth and serves as the bottom of a guide channel C for articles A which can be deposited at the forward end F of the trough from a hopper 30; see FIG. 5. The wall 26 has a multiplicity of staggered transverse slits 35 extending part way across the wall alternately from the lateral edges of wall 26. Rear edges 36 of each slit are bent inwardly or downwardly to project slightly into the duct D. The lips 37 of the slits defined by the downwardly bent edges 36 define angles of not more than ten degrees (10°) and preferably about five degrees (5°) with wall 26 so that narrow openings P are provided at each slit to pass air out of the duct into the upper portion of the trough. The air will pass through the openings P only in rearward direction toward rear end R of the channel C.

The partition 25 may be formed with a depending rear end wall 39 which supports a plate extending upwardly and curved forwardly at its upper edge to define an air guide and baffle 41; see FIG. 5.

An air blower 32 may have its outlet end 38 secured in an opening 40 formed at the rear end of bottom 11 of the trough immediately forward of baffle 41. The blower has a lateral air inlet $32'$.

Another baffle wall or plate 43 can be provided at the forward end of duct D. This plate has an upper portion $43^a$ bent rearwardly just forwardly of hopper 30.

In operation of the conveyor assembly 10, as shown in FIG. 5, articles A are deposited on the forward end of channel C on the flat upper side 27 of wall 26. A forced air stream S1 at high velocity passes out of blower 32 at the rear end of duct D and is deflected toward the forward end of the duct. It will be noted that the air passes forwardly along the upper side of the bottom wall 11. The air stream is reversed at baffle 43 and passes rearwardly through openings P in the slits to form air stream S2. The blower is preferably placed at the rear end of the duct D since it has been found that a more uniform air stream S2 is formed above the upper surface 27 of wall 26. The articles A are carried in or on the air stream S2. The blower 32 could be located at the forward end of the duct as indicated at 32 by dotted lines in FIG. 5. It will be noted that the articles A can be caused to pass upwardly from a lower to an upper level when the conveyor assembly 10 is inclined upwardly from front to rear ends as shown in FIG. 5. The small light articles A are carried rapidly up the channel C. If the articles are in a heated condition as they are discharged from a molding machine (not shown) through hopper 30, the thin sheet metal walls of the channel C will conduct the heat away when the articles contact the walls during passage through the channel. In addition, the heat will be carried away in the air stream S2. Since the top of the trough is open, cooling of the articles is facilitated. The overhanging lateral flanges of the trough insure that no articles are thrown upwardly out of the trough. These flanges will deflect any such articles downwardly.

FIG. 8 shows how two troughs 12' and 12" can be quickly secured together to lengthen the conveyor assembly. Arms 22' of the forward trough 12' are engaged on pins 23" of the rear trough 12". The assembly can be disposed in a horizontal position if desired or can incline downwardly from front to rear ends. When two troughs are secured together in alignment, partitions 25', 25" will also be aligned to define a long, continuous duct D'. The front end wall 19 and baffle 43 shown in trough 12 of FIG. 5 will be omitted from trough 12" but will be supplied for trough 12'. The rear end wall 39 and baffle 41 of duct D will be omitted from partition 25' so that duct D' is uninterrupted.

For a conveyor assembly having two or more troughs connected together, more than one blower 32 can be provided, with one blower for each one, two or more interconnected troughs.

In all forms of the invention, the conveyor assembly is characterized by a simplified structure. All walls of the guide channel C and duct D are formed by thin sheet metal material which is inexpensive, easy to work, light in weight, and a good heat conductor.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A conveyor assembly comprising a long open top trough made of thin, light sheet metal material having high heat conductivity, said trough having a flat bottom wall and two integrally formed upstanding vertical side walls at lateral edges of the bottom wall, means to direct light weight articles through the open top of the trough, said side walls being bent inwardly at their upper edges to define two inclined side walls for holding the articles in the trough while permitting air to circulate through the open top, inner sides of said walls being bent to define two grooves extending substantially the entire length of the trough and located a fixed distance above said bottom wall; and a partition made of thin, light sheet metal material constituted by wall and a pair of depending side walls, the side walls of the partition being engaged removably in said grooves, said partition wall having a series of transverse slits therein spaced apart longitudinally of said partition wall to define passages for air, said partition walls with the bottom and side walls of the trough defining a duct, said duct extending substantially the entire length of the trough, said partition wall and said side walls of the trough defining a channel above said duct extending substantially the entire length of the trough, baffles at opposite ends of the duct; and means for blowing a forced air stream into the duct at one end thereof, whereby air streams pass through said slits and along said channel to move said articles along the trough from front to rear ends thereof, said slits having lips at rear edges thereof bent inwardly and forwardly of the duct toward said bottom wall in planes inclined not more than 10° to said top wall so that said air streams pass along the bottom of said channel in a direction rearwardly of said channel, one of said baffles at the rear one of said baffles at the rear end of the duct being curved inwardly at its upper end for deflecting air toward the forward end of the duct, the other one of said baffles extending upwardly at the forward end of the duct into said channel and bent rearwardly to deflect articles downwardly at the front end of the channel.

2. A conveyor assembly comprising a long open top trough made of thin, light sheet metal material having high heat conductivity, said trough having a flat bottom wall and two integrally formed upstanding vertical side walls at lateral edges of the bottom wall, means to direct light weight articles through the open top of the trough, said side walls being bent inwardly at their upper edges to define two inclined side walls for holding the articles in the trough while permitting air to circulate through the open top, inner sides of said walls being bent to define two grooves extending substantially the entire length of the trough and located a fixed distance above said bottom wall; and a partition made of thin, light sheet metal material constituted by wall and a pair of depending side walls, the side walls of the partition being engaged removably in said grooves, said partition wall having a series of transverse slits therein spaced apart longitudinally of said partition wall to define passages for air, said partition walls with the bottom and side walls of the trough defining a duct, said duct extending substantially the entire length of the trough, said partition wall and said side walls of the trough defining a channel above said duct extending substantially the entire length of the trough, baffles at opposite ends of the duct; and means for blowing a forced air stream into the duct at one end thereof, whereby air streams pass through said slits and along said channel to move said articles along the trough from front to rear ends thereof, a pair of notched arms at one end of the trough extending longitudinally outwardly thereof, and a pair of pins at the other end of the trough extending laterally thereof for attaching other similar troughs with other partitions therein at opposite ends of the trough to lengthen said duct and channel, end of the duct being curved inwardly at its upper end for deflecting air toward the forward other end of the duct, the other one of said baffles extending upwardly at the forward end of the duct into said channel and bent rearwardly to deflect articles downwardly at the front end of the channel.

References Cited by the Examiner
UNITED STATES PATENTS

| | | | |
|---|---|---|---|
| 1,004,976 | 10/11 | Bodman | 193—35 |
| 2,718,296 | 9/55 | Johnson | 198—204 |
| 3,131,974 | 5/64 | Futer | 302—31 |

SAMUEL F. COLEMAN, *Primary Examiner.*
ANDRES H. NIELSEN, *Examiner.*